United States Patent

[11] 3,584,289

| [72] | Inventors | John D. Bishop<br>Basking Ridge;<br>Frank F. Judd, Madison; Peter P. Untamo,<br>Somerset, all of, N.J. |
|---|---|---|
| [21] | Appl. No. | 816,935 |
| [22] | Filed | Apr. 17, 1969 |
| [45] | Patented | June 8, 1971 |
| [73] | Assignee | Bell Telephone Laboratories, Incorporated<br>Murray Hill, N.J. |

[54] REGULATED INVERTER USING SYNCHRONIZED LEADING EDGE PULSE WIDTH MODULATION
3 Claims, 2 Drawing Figs.

[52] U.S. Cl. .................................................. 321/18,
321/2, 321/11, 331/113.1, 331/117
[51] Int. Cl. ..................................................... H02m 3/14,
H03k 3/281, H03b 5/00
[50] Field of Search .......................................... 321/2, 16,
18, 11; 331/113.1, 117

[56] References Cited
UNITED STATES PATENTS

| 3,268,833 | 8/1966 | Miller et al. | 331/113.1UX |
| 3,324,377 | 6/1967 | Mills | 321/16 |
| 3,361,952 | 1/1968 | Bishop | 331/113.1UX |
| 3,408,553 | 10/1968 | Bishop | 321/16 |

*Primary Examiner*—William H. Beha, Jr.
*Attorneys*—R. J. Guenther and E. W. Adams, Jr.

ABSTRACT: A regulated inverter circuit wherein leading edge pulse width modulation is obtained by employing a modulator control network synchronized with the sinusoidal feedback bias which delays the application of this bias for an interval determined by load voltage variations. Deleting the leading edge of the sinusoidal driving waveform allows the inverter transistors to be efficiently biased from cutoff to saturation and at the same time eliminates the adverse effects of stored charge when the transistors are driven from saturation to cutoff.

INVENTORS J.D. BISHOP
F.F. JUDD
P.P. UNTAMO

BY John P. McDonnell
ATTORNEY 3,584,289

REGULATED INVERTER USING SYNCHRONIZED LEADING EDGE PULSE WIDTH MODULATION

BACKGROUND OF THE INVENTION

This invention relates to DC to AC inverter circuits and, more particularly, to regulated inverter circuits using leading edge pulse width modulation.

The prior art has long recognized the desirability of combining a closed feedback loop with DC to AC inverter circuits to obtain voltage and current regulation simultaneously with the inversion. This regulated inversion has been obtained by a variety of methods which include: (1) the insertion of a series transistor which acts as a variable impedance under control of load voltage variations either at the input or output of the inverter, (2) the use of two inverters whose outputs are serially connected and displaced by a phase angle proportional to load voltage variations so that the waveforms add or subtract to provide a regulated output, and (3) by pulse width modulation techniques.

In all these inverter circuits, and in pulse width regulated circuits in particular, the waveform of the transistor driving circuit may be either a sine wave or a square wave. Sine wave driving circuits are preferred because of their ease of design and lower circuit cost. The use of a sine wave drive, however, involves a compromise between either loss of efficiency at the time the transistors are turned on or the adverse effects of stored charge in the transistors at the time the transistors are turned off. If a sine wave of a relatively low peak magnitude is employed as the driving signal, the initial slope of the signal drives the turning on transistor relatively slowly through the active state, where the transistor acts as a variable resistance, from cutoff to saturation. The efficiency of inversion is thus reduced. If the magnitude of the sine wave is increased to a higher peak value, the transistors may be driven rapidly from cutoff to saturation to improve the efficiency of inversion, but the charge stored in the transistors is sufficiently large at transistor turn off to prevent rapid dissipation. If the charge stored in the transistors is not dissipated quickly, the normally oppositely conductive inverter transistors may be simultaneously conductive and thereby damage or destroy at least some of the inverter components. A sine wave of lesser magnitude has a more gradual trailing slope, symmetrical to the initial slope, which allows the transistor to pass from saturation to cutoff relatively slowly and dissipate the charge stored in the transistors. Thus, a sine wave of a relatively large magnitude is preferred for turn on whereas a sine wave of a lesser magnitude is preferred for turn off.

A square wave driving waveform with its step-function leading edge, biases the transistors rapidly through the active state from cutoff to saturation and need only have a peak magnitude sufficient to bias the transistor into saturation. In addition to its disadvantages of additional circuit cost and design complexity, however, a square wave drive drops abruptly at its trailing edge in biasing the transistor from saturation to cutoff. As in the case of the high peak value sine wave drive, the charge stored in the transistors is thus often not dissipated quickly enough to prevent simultaneous conduction through both inverter transistors.

In the pulse width modulated circuits of the prior art, the transistors are driven by a square wave, and the trailing edge of the resulting square wave output waveform is prematurely terminated, usually by modifying the output waveform, in accordance with load voltage variations. The more complex and expensive square wave driving circuitry is employed to obtain the efficiency advantages of this type of driving waveform noted heretofore. These circuits, however, suffer from all the disadvantages of stored charge at transistor turn off which in turn affects the accuracy with which a pulse may be prematurely terminated to obtain regulation.

It is, therefore, an object of this invention to provide regulated inversion using pulse width modulation techniques which do not require a square wave driving signal.

It is a further object of this invention to provide regulated inversion using a sinusoidal driving signal without reducing the efficiency of inversion.

SUMMARY OF THE INVENTION

In the present invention, leading edge pulse width modulation techniques are employed to obtain regulated inversion. Using closed loop techniques, the initiation of each half cycle of bias in the inverter feedback or driving loop is sensed and its application delayed for an interval determined by load voltage variations without interfering with the normal switching frequency of the inverter. The delay is accomplished by effectively shorting a winding on the inverter feedback transformer at each zero crossing on the time axis of the sinusoidal feedback or control current and maintaining this condition for an interval determined by the output signal from the load voltage variation responsive error detector Shorting a winding on the feedback transformer causes all the feedback or driving bias to be induced in the shorted winding and holds both transistors cutoff. When the effective short circuit is automatically removed, the sinusoidal driving current is normally well past its zero point and approaching its peak value. The magnitude of driving potential applied to the inverter transistors at this point is thus relatively large and the appropriate inverter transistor is quickly biased into saturation. The driving signal seen by the transistors thus resembles a square wave at turn on and is a sinusoid at turn off so that the transistors are efficiently biased quickly into saturation at turn on and biased relatively slowly into cutoff to eliminate both the efficiency and storage time problems noted heretofore. Moreover, during the interval that both transistors are held cutoff by the shorted winding on the feedback transformer, the inverter is immune to the possibility that a transient may cause continued conduction through the cutting-off inverter transistor and the resulting possibility of simultaneous conduction through both inverter transistors.

BRIEF DESCRIPTION OF THE DRAWINGS

Other objects and features of the present invention will readily be apparent from the following discussion and drawings in which.

DETAILED DESCRIPTION

Figure 1:
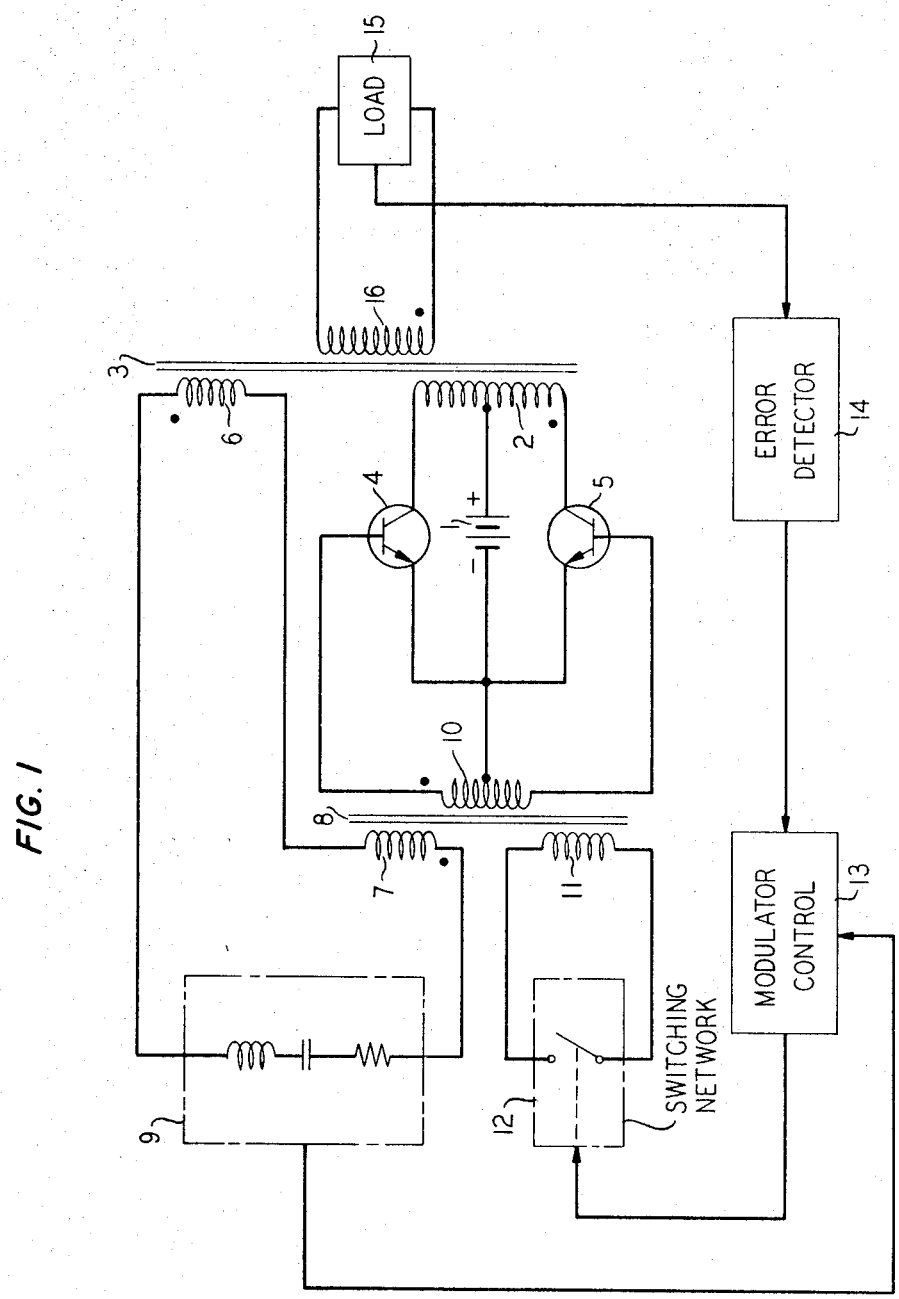
FIG. 1 is a block diagram of the present invention.

In FIG. 1 of the drawing, the DC input source 1 is connected in a series path with a first portion of the primary winding 2 of transformer 3 and the collector-emitter path of inverter transistor 4. A second portion of primary winding 2 of transformer 3 is serially connected with the collector-emitter path of transistor 5 and the DC input source 1. Voltage feedback is provided via the series loop comprising tertiary winding 6 on power transformer 3, primary winding 7 on feedback transformer 8, and the frequency control network 9. Frequency control network 9, which may comprise a series resistor-inductor-capacitor or RLC resonant network, determines the oscillating frequency of the transistors 4 and 5 as discussed in detail in connection with FIG. 2. Equal portions of the secondary winding 10 of feedback transformer 8 are connected to the base-emitter paths of transistors 4 and 5. Tertiary winding 11 of feedback transformer 8 is connected to switching network 12 which is schematically represented as a single-pole, single-throw switch in FIG. 1, for purposes of illustration. Switching network 12 controls the point in each half cycle of oscillation at which feedback driving bias is applied to the inverter transistors 4 and 5 as discussed in detail hereinafter. Switching network 12 is in turn controlled by modulator control network 13 which is responsive to a synchronizing signal from the frequency control network 9 and an error detector 14. Error detector 14 compares variations in the voltage across load 15 with a reference voltage and delivers this difference or error signal to modulator control network 13 to obtain closed loop regulation. The load 15 is connected to the secondary winding 16 of transformer 3.

For the present purpose of explaining the operation of the regulated inverter of FIG. 1, it is assumed that oscillation has been initiated in the inverter comprising transistors 4 and 5. This oscillation may have been initiated due to the inherent differences in the transistor characteristics or due to the application of starting bias by one of several networks well known in the art. These prior art starting networks provide a small amount of forward bias to either the feedback loop or one or the other of the inverter transistors sufficient to initiate oscillation. Once initial oscillation is begun, the starting network usually has no further function.

For purposes of illustration, then, it is assumed that transistor 4 is conductive, while transistor 5 is cutoff. Current flows from the positive terminal of DC source 1 through the upper portion of primary winding 2 of transformer 3 and the collector-emitter path of transistor 4 back to the negative terminal of the source 1. As can be seen from the dot convention, the current induced in winding 6 of transformer 3 due to this current flow causes current to flow out of the dot of winding 6, through the frequency control network 9, and into the dot of primary winding 7 of transformer 8. The current flow through the primary winding 7 of feedback transformer 8 in turn induces a current in winding 10 of this transformer which, as can be seen from the dot convention, biases transistor 4 further into conduction. The parameters of the feedback network comprising windings 6 and 7 are chosen such that the conductive transistor, in this case transistor 4, is driven quickly into saturation by the current flow through the feedback loop comprising the series RLC frequency control network 9. Although the current through the load 15 will thus resemble a square wave, the current through the loop comprising the series resonant RLC frequency control network would characteristically resemble a damped sinusoid if allowed to oscillate for several cycles in response to the potential induced in winding 6.

This process then continues for the duration of the half cycle current which flows out of the dot of winding 6 and into the dot of winding 7. At the end of this half cycle, the inherent ringing or oscillatory action of the series RLC network causes the sinusoidal current in the feedback loop comprising windings 6 and 7 to reverse. Reversing the current in the loop quickly biases transistor 5 into saturation and transistor 4 into cutoff. The process discussed heretofore for transistor 4 then begins for transistor 5 until the resonant network causes transistor 4 to again be saturated and transistor 5 to be cutoff and so on. An alternating voltage is thus induced in winding 16 of power transformer 3 to supply the load 15.

The switching network 12, the modulator control network 13, and the error detector 14 provide leading edge pulse width modulation to each half cycle of this inversion process. As noted heretofore, error detector 14, which may be the well known single transistor-zener diode network, compares the voltage across the load 15 with the zener diode reference voltage and delivers the difference or error signal between these voltages to modulator control network 13. In the manner discussed in detail in connection with FIG. 2, modulator control network 13 is synchronized with the zero crossing on the time axis of both the positive and negative going portions of the sinusoidal current flowing in the feedback loop comprising the frequency control network 9. Once the waveform of the current in the feedback loop crosses the zero crossing in either the positive or negative going direction, the modulator control network 13 activates the switching network to short circuit winding 11 of feedback transformer 8. Now all the energy induced in feedback transformer 8, due to the current flow through primary winding 7, is induced in winding 11 due to the negligible impedance presented by this winding. Essentially no current is induced in winding 10 to drive the turning on transistor into the active state toward saturation. Both transistors 4 and 5 are thus held cutoff for the interval that the winding 11 remains short circuited. The interval that winding 11 is held short circuited is, in turn, determined by the difference or error signal output of error detector 14. For load voltages higher than the desired load voltage, the winding 11 would be shorted for a longer interval than for a load voltage of the desired value. Closed loop regulation is thus obtained. Since leading edge pulse width modulation which is synchronized at the basic switching rate of the inverter is employed, the regulated inverter is automatically protected against input source and load transients that would cause a loss of regulation due to false firing (initiation of conduction in, or continued conduction through, the cutting-off transistor) of the parallel inverter. Although the synchronizing signal for the modulator control network 13 is shown in FIG. 1 as being taken from the frequency control network 9, this signal could be taken from other points in the circuit as, for example, from the voltages induced in the windings of output transformer 3. Since the voltages in other parts of the inverter may be subject to other disturbances such as noise and changes in input voltages, however, taking the signal from the frequency control network 9 is preferred.

Figure 2:
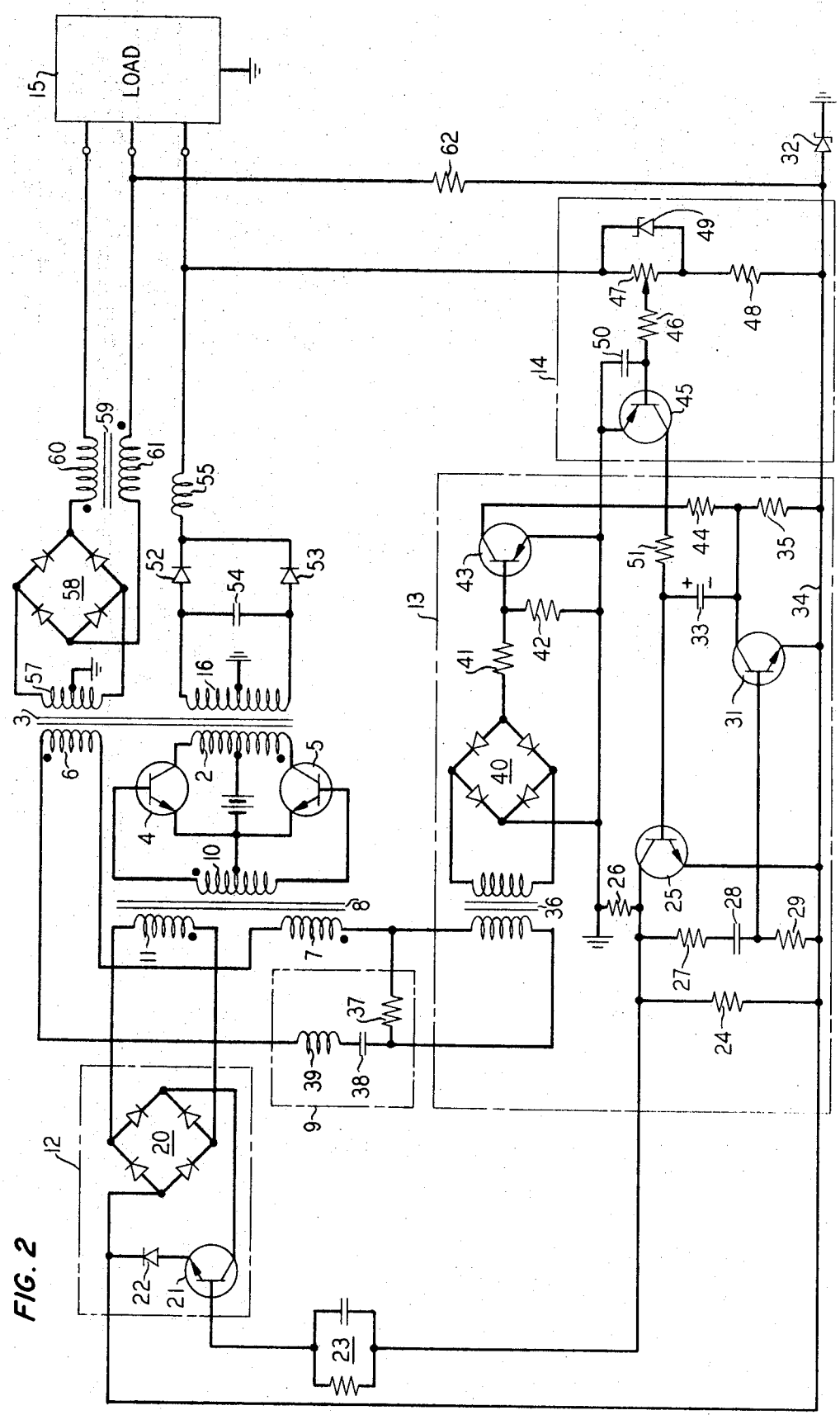
FIG. 2 is a schematic diagram of the block diagram of FIG. 1.

The operation and features of the present invention are discussed in greater detail in FIG. 2. In FIG. 2, the numerals used to designate specific components are the same as the numerals for the same components in FIG. 1. The switching network 12 of FIG. 1 is illustrated in FIG. 2 as comprising a full-wave diode bridge rectifier 20 whose input terminals are connected across winding 11 of feedback transformer 8 and whose output terminals are serially connected with the collector-emitter path of a transistor 21 and a diode 22. Both diode 22 and the collector-emitter path of transistor 21 are biased for forward conduction from the positive output terminal of the bridge rectifier 20 to the negative output terminal. Transistor 21 is driven between the saturated and cutoff states as a switch while diode 22 serves to provide a cutoff bias for transistor 21. The parallel resistor-capacitor network 23 and resistor 24 of the modulator control network 13 are serially connected with the base-emitter control path of transistor 21 and diode 22 to control the switching action of transistor 21, as discussed hereinafter.

The modulator control network 13 includes transistor 25, whose collector-emitter path is connected across resistor 24. Resistor 26 is connected from the collector electrode of transistor 25 to ground to provide a collector load for transistor 25. Resistor 27, capacitor 28, and resistor 29 are serially connected across resistor 24. Capacitor 28 is employed to control conduction through transistors 25 and 31, as discussed in detail hereinafter. The base-emitter path of transistor 31 is connected across resistor 29 from which it derives its driving bias. Capacitor 33 is connected from the collector electrode of transistor 31 to the base electrode of transistor 25. Resistor 35 is connected across the collector-emitter path of transistor 31.

The modulator control network 13 has an isolating transformer 36 whose primary winding is connected across resistor 37 of the frequency control network 12 to sample the sinusoidal driving current of the series resonant network which also includes capacitor 38 and inductor 39. This series resonant network serially connects winding 6 of power transformer 3 and winding 7 of feedback transformer 8. The secondary winding of isolating transformer 36 is connected to the input terminal of full wave bridge rectifier 40. Resistors 41 and 42 are connected across the output terminals of bridge rectifier 40 to provide biasing potentials for transistor 43. Transistor 43 has its base-emitter path connected across resistor 42 to be responsive to the zero crossings on the time axis of the sinusoidal current in the frequency control loop. The emitter electrode of transistor 43 is connected to ground. The collector electrode of transistor 43 is connected by resistor 44 to the juncture of resistor 35 and the collector electrode of transistor 31.

The error detector 14 comprises transistor 45 whose emitter electrode is connected to ground while its base electrode is connected by resistor 46 to the wiper arm of potentiometer 47. Potentiometer 47 is serially connected with resistor 48 from one terminal of the load 15 to the emitter electrode of transistor 31. Zener diode 49 is connected across potentiometer 47 to provide a constant reference voltage. The common terminal of load 15 is grounded. Capacitor 50 is connected across the base-emitter path of transistor 45 as an AC bypass. Resistor 51 connects the collector electrode of error detector transistor 45 to the base electrode of transistor 25 and limits the collector dissipation of transistor 45.

Secondary winding 16 of output transformer 3 is center tapped to ground and diodes 52 and 53 are connected as a full-wave rectifier. Capacitor 54 is connected across the secondary winding 16 of transformer 3 to serve as a filter. Inductor 55 is serially connected from the positive output terminal of the full-wave rectifier comprising diodes 52 and 53 to the load 15 to also provide filtering action. A fourth winding 57 on power transformer 3 provides several output voltages, rather than a single output voltage, for applications where the load requires several output potentials. Full-wave rectifier 58 has its input terminals connected across winding 57 of transformer 3. The center tap of winding 57 is grounded. Filter inductor 59 has two windings, 60 and 61, wound on a common core to provide ripple filtering in the supply from winding 57. Winding 60 is connected from one output terminal of bridge rectifier 58 to the load 15, while winding 61 is connected from the other output terminal of bridge rectifier 58 to the load 15. Resistor 62 is connected from the output of filter winding 61 to provide a local negative supply voltage on lead 34 for error detector 14 and for modulator control 13. Zener diode 32 is connected from ground to resistor 62 to regulate this local negative supply. The error detector transistor 45 samples the voltage output between the output of inductor 55 and ground, as discussed in detail hereinafter.

As noted heretofore, the modulator control network 13 may be synchronized with the inverter feedback control network 9. The primary winding of transformer 36 is connected across resistor 37 of the frequency control network to transmit a current having an identical phase to the inverter driving current to the bridge rectifier 40 which rectifies this driving sinusoidal current to provide a DC bias for transistor 43. Each time the sinusoidal driving current crosses its zero point on the time axis, the DC biasing potential applied to transistor 43 falls to zero and the transistor is momentarily cut off. When transistor 43 momentarily cuts off, the voltage at its collector electrode sharply decreases to the negative local supply voltage on lead 34 for the duration of the cutoff interval. This sharp momentary decrease of potential is reflected at the junction of resistors 44 and 35 and transmitted via capacitor 33 to the base electrode of transistor 25 to bias this transistor into cutoff. Once transistor 25 is cutoff, capacitor 28 begins to charge. This charge path may be traced from the collector of transistor 25 through resistor 27, capacitor 28, and the parallel path of resistor 29 and the base-emitter junction of transistor 31. Transistor 31 is thus biased into conduction.

Before discussing the function of transistor 31, it is desirable to examine the function of the error detector network 14. Transistor 45 of this network compares load voltage variations between the output voltage at inductor 55 and ground with the reference voltage of zener diode 49. A difference or error signal proportional to these load voltage variations then appears at the collector electrode of transistor 45 and is transmitted by resistor 51 to both the base electrode of transistor 25 and capacitor 33. Which of these two paths the collector current difference signal takes depends upon the states of conduction of transistor 31 which, as discussed heretofore, is in turn controlled by the state of conduction of transistor 25. If transistor 31 is cutoff, the difference signal current flows in the base-emitter path of transistor 25 to maintain conduction through this transistor. If transistor 31 is conductive, due to the reaction of transistor 43 to the zero crossing of the driving sinusoid in the process just described, then the difference or error signal current flows through capacitor 33 and the collector-emitter path of transistor 31. This charging of capacitor 33 by the difference or error signal output of the error detector 14 provides duty cycle timing of the inverter circuit.

As discussed heretofore, the zero crossing of the sinusoidal driving current of the inverter momentarily turns transistor 43 off which, in turn, turns transistor 25 off and transistor 31 on. As was noted, capacitor 33 then linearly discharges and charges at a rate determined by the difference or error signal output current from error detector transistor 45 through the collector-emitter path of transistor 31. Capacitor 33 continues to discharge and then charges to the potential having a polarity shown in the drawing until the magnitude of the potential stored in capacitor 33 is such as to again forward bias the base-emitter path of transistor 25 into conduction which, of course, also initiates current flow through the collector-emitter path of transistor 25.

The potential at the collector electrode of now conductive transistor 25 is transmitted to the base electrode of transistor 21 of the switching network 12 through the resistor-capacitor network 23 with the resistor of this network providing current limiting and the capacitor providing a speedup action. When the sinusoidal driving current of the inverter momentarily turns transistors 43 and 25 off, the voltage at the collector electrode of transistor 25 rises sharply and biases transistor 21 into saturation. Saturating transistor 21 puts a very low impedance path comprising the small impedance of the collector-emitter path of this transistor and the forward resistance of diode 22, which approximates a short circuit, across the output terminals of the bridge rectifier 20 and across winding 11. As noted in connection with FIG. 1, short circuiting winding 11 causes substantially all the feedback bias in transformer 8 to be induced in winding 11 with only a negligible potential induced in winding 10. Since this process was initiated at the zero crossing of the sinusoidal current in the driving circuit, the previously conducting inverter transistor is cutoff. With no appreciable forward bias being induced in winding 10 due to the virtual short circuit across winding 11, the previously nonconducting transistor is also held cutoff. Both inverter transistors remain cutoff under the control of the error detector network 14, as discussed, until transistor 25 is again biased into conduction, its collector drops, and switching network transistor 21 is again cutoff. The feedback potential in transformer 8 is now induced in winding 10 rather than winding 11 and the appropriate inverter transistor is biased quickly into saturation. The delay between the zero crossing of the sinusoidal driving current and the initiation of conduction of this turning on transistor is thus determined in accordance with load voltage variations and closed loop regulation is obtained. Since modulation is obtained at the beginning of each half cycle, it is referred to as leading edge pulse width modulation.

The function of timing capacitor 33 should perhaps be noted in further detail. When transistor 31 is cutoff and transistor 25 is conductive, capacitor 33 is charged by the current flowing from the emitter-collector path of transistor 43 in a path which includes resistor 44, the base-emitter path of transistor 25, and zener diode 32 to ground. At the base of transistor 25, this current adds to the difference or error signal current from the collector electrode of error detector transistor 45 to maintain conduction through transistor 25 even in the presence of transients in the collector current of transistor 45. When transistor 31 is biased into conduction, the charge on capacitor 33 is thus opposite in polarity to the polarity of the charge shown in the drawing. This charge adds to the reverse bias across the base-emitter path of transistor 25 supplied by the collector-emitter path of transistor 31 to drive transistor 25 well into cutoff. In the process described heretofore, capacitor 33 is then linearly discharged and charged by the error signal current flow from error detector transistor 45 until the magnitude of the potential having the polarity shown in the drawing is sufficient to again bias transistor 25 into conduction.

In summary, transistor 43 is momentarily biased into cutoff each time the sinusoidal driving current crosses the zero point on the time axis. Once transistor 43 cuts off, transistor 25 also cuts off and causes switching network transistor 21 to be biased into saturation and thereby remove the driving bias to the inverter transistors. Transistor 25 remains cutoff until capacitor 33 is sufficiently charged by the error signal from the error detector transistor 45 to again bias transistor 25 into conduction and switching network transistor 21 into cutoff to again permit the application of feedback driving bias to the inverter transistors. The cycle is then repeated for each half cycle of sinusoidal feedback driving bias, as discussed heretofore. Leading edge pulse width modulation is thus obtained under the control of load voltage variations.

We claim:

1. A regulated inverter comprising first and second transistors each having their collector-emitter paths connected with a source of input potential and at least a portion of the primary winding of a power transformer, a load coupled to the secondary winding of said power transformer, an error detector connected to said load to compare variations in said load voltage with a reference voltage, a feedback transformer having primary, secondary, and tertiary windings, a feedback network connected to the primary winding of said feedback transformer, means connecting the base-emitter paths of said first and second transistors to respectively equal portions of said secondary winding of said feedback transformer to drive said first and second transistors alternately between the conductive and nonconductive states in oscillation, switching means connected to the tertiary winding of said feedback transformer to divert the driving bias to the base-emitter paths of said first and second transistors from said secondary winding of said feedback transformer to said tertiary winding whenever said switching means is activated, an isolation transformer having primary and secondary windings, said primary winding of said isolation transformer being connected to said feedback network, modulating means connected to said switching means and said error detector to control the duration of the interval that said switching means is activated in accordance with load voltage variations, and means connecting said modulating means to said secondary winding of said isolation transformer to sense the initiation of each half cycle of driving bias in said feedback network and synchronize the activation of said switching means therewith while maintaining isolation between the higher power circuitry comprising said first and second inverter transistors and the relatively lower power circuitry of said modulating means.

2. A regulated inverter comprising first and second transistors having their collector-emitter paths connected with a source of input potential and equal portions of the primary winding of a power transformer, a load connected to the secondary winding of said power transformer, a feedback network comprising a third winding on said power transformer and a feedback transformer having primary, secondary, and tertiary windings, a resistor-inductor-capacitor series resonant network serially connected with the primary winding of said feedback transformer and said third winding on said power transformer, the base-emitter paths of said first and second transistors being connected to respectively equal portions of the secondary winding of said feedback transformer, switching means comprising a third transistor having its collector-emitter path connected across said tertiary winding of said feedback transformer to remove the driving bias to said first and second transistors whenever said third transistor is in deep conduction, a modulating control network connected to the base-emitter path of said third transistor to control conduction through said third transistor, said modulating control network including a fourth transistor having its base-emitter path coupled across said resistor in said series resonant circuit in said feedback network and its collector-emitter path connected with the base-emitter path of said third transistor to initiate conduction through said third transistor whenever the sinusoidal current in said feedback loop approaches its zero value, an error detector connected to said load to compare variations in load voltage with a reference voltage, a second capacitor connected to said error detector to be charged by the error signal output of said error detector, and means connected to said second capacitor and the base-emitter path of said third transistor to cutoff said third transistor when the charge on said capacitor reaches a predetermined value.

3. A regulated inverter comprising first and second transistors each having their collector-emitter paths connected with a source of input potential and at least a portion of the primary winding of a power transformer, a load connected to the secondary winding of said power transformer, a feedback transformer having primary, secondary, and tertiary windings, a series resonant resistor-capacitor-inductor network serially connected with a feedback winding on said power transformer and the primary winding of said feedback transformer, means connecting the base-emitter paths of said first and second transistors to equal portions of the secondary winding of said feedback transformer to provide regenerative feedback bias to said transistors, an error detector connected to said load to compare variations in load voltage with a reference voltage and deliver an error signal output proportional to this difference, a third transformer having primary and secondary windings, means connecting the primary winding of said third transformer across said resistor of said series resonant resistor-capacitor-inductor circuit, a third transistor having its base-emitter path connected across the secondary winding of said third transformer to be responsive to the crossings on the time axis of the sinusoidal current in said series resistor-capacitor-inductor resonant circuit, a rectifier having its input terminals connected across the tertiary winding of said feedback transformer, a fourth transistor having its collector-emitter path connected across the output terminals of said bridge rectifier, means including a capacitor connecting the collector-emitter path of said third transistor to the base-emitter path of said fourth transistor to bias said fourth transistor into conduction each time the sinusoidal current through said series resistor-capacitor-inductor resonant network crosses the time axis, means connecting said error signal output from said error detector to said capacitor to charge said capacitor whenever said fourth transistor is biased into conduction, and means connected to said capacitor and the base-emitter path of said fourth transistor to be responsive to the magnitude of the charge on said capacitor so as to terminate conduction through said fourth transistor when the charge on said capacitor reaches a predetermined magnitude, whereby leading edge pulse width modulation is obtained.